(12) United States Patent
Wang et al.

(10) Patent No.: US 10,424,224 B2
(45) Date of Patent: Sep. 24, 2019

(54) GLOVE FOR USE IN COLLECTING DATA FOR SIGN LANGUAGE RECOGNITION

(71) Applicant: Bosch (Shanghai) Smart Life Technology Ltd., Shanghai (CN)

(72) Inventors: Ben Wang, Jiangsu (CN); Xiaohua Jiang, Jiangsu (CN); Hong Luo, Jiangsu (CN); Liu Ren, Palo Alto, CA (US); Jianjie Zhang, Palo Alto, CA (US); Kui Xu, Palo Alto, CA (US); Yen-Lin Chen, Palo Alto, CA (US); Zhenyu Zhou, Palo Alto, CA (US); Wenwei Guo, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 202 days.

(21) Appl. No.: 15/504,708

(22) PCT Filed: Aug. 20, 2015

(86) PCT No.: PCT/CN2015/087612
§ 371 (c)(1),
(2) Date: Feb. 17, 2017

(87) PCT Pub. No.: WO2016/026450
PCT Pub. Date: Feb. 25, 2016

(65) Prior Publication Data
US 2017/0263154 A1    Sep. 14, 2017

(30) Foreign Application Priority Data

Aug. 20, 2014 (CN) .................... 2014 2 0471698 U

(51) Int. Cl.
*G09B 21/00* (2006.01)
*G06F 3/01* (2006.01)
(Continued)

(52) U.S. Cl.
CPC .......... *G09B 21/009* (2013.01); *G06F 3/014* (2013.01); *G06F 3/017* (2013.01);
(Continued)

(58) Field of Classification Search
CPC ....... G06F 3/014; G06F 3/017; G09B 21/009; G09B 13/04; G09B 21/00; G06K 9/00355
(Continued)

(56) References Cited

U.S. PATENT DOCUMENTS 5,047,952 A    9/1991   Kramer et al.
5,212,372 A *  5/1993   Quick .................... G06F 3/014
                                                235/462.44
(Continued)

FOREIGN PATENT DOCUMENTS

CN    103226398 A    7/2013
CN    204044747 U    12/2014
WO    01/59741 A1    8/2001

OTHER PUBLICATIONS

International Search Report corresponding to PCT Application No. PCT/CN2015/087612, dated Oct. 30, 2015 (German and English language document) (5 pages).

*Primary Examiner* — Jack Yip
(74) *Attorney, Agent, or Firm* — Maginot, Moore & Beck LLP

(57) ABSTRACT

A glove for use in collecting data for sign language recognition comprises: multiple azimuth sensors arranged on the glove at positions corresponding to the phalanges and metacarpal bones of the hand and used for sensing postures of the hand. The azimuth sensors are only arranged on the glove at positions corresponding to the phalanges of the hand other than the distal phalange in proximity to the fingertip of at least one finger among the middle finger, the index finger, the ring finger, and the little finger. The glove reduces the number of the azimuth sensors arranged on the glove at (Continued)

positions corresponding to the phalanges of the hand, thus reducing costs while not affecting detection performance.

9 Claims, 9 Drawing Sheets

(51) Int. Cl.
  *G06K 9/00* (2006.01)
  *G09B 13/04* (2006.01)
(52) U.S. Cl.
  CPC .......... *G06K 9/00355* (2013.01); *G09B 13/04* (2013.01); *G09B 21/00* (2013.01)
(58) Field of Classification Search
  USPC ........................................................ 434/112
  See application file for complete search history.

(56) References Cited

U.S. PATENT DOCUMENTS

| | | | | |
|---|---|---|---|---|
| 5,216,193 A * | 6/1993 | Masubuchi | .......... | G10H 1/0558 338/99 |
| 6,325,768 B1 * | 12/2001 | Williams | ............. | A61B 5/1071 600/595 |
| 9,060,385 B1 * | 6/2015 | Manning | ................ | H04W 84/18 |
| 9,104,271 B1 * | 8/2015 | Adams | .................. | G06F 3/0426 |
| 9,996,153 B1 * | 6/2018 | Trotta | ..................... | G06F 3/014 |
| 2002/0105446 A1 * | 8/2002 | Mehring | ................ | G06F 3/014 341/22 |
| 2002/0152077 A1 * | 10/2002 | Patterson | ................ | G06F 3/014 704/271 |
| 2004/0034505 A1 * | 2/2004 | Kimble | ................... | G06F 3/014 702/182 |
| 2005/0052412 A1 * | 3/2005 | McRae | ................... | A63F 13/06 345/158 |
| 2012/0025945 A1 * | 2/2012 | Yazadi | ................ | H04L 67/1095 340/4.2 |
| 2014/0028538 A1 * | 1/2014 | Shin | ....................... | G06F 3/014 345/156 |
| 2015/0035743 A1 * | 2/2015 | Rosener | ................... | G06F 3/014 345/156 |
| 2015/0297938 A1 * | 10/2015 | Dyer | ................... | A63B 21/0557 2/160 |
| 2016/0256082 A1 * | 9/2016 | Ely | ....................... | A61B 5/0024 |
| 2016/0364010 A1 * | 12/2016 | Amma | ................ | G06K 9/00355 |
| 2016/0375307 A1 * | 12/2016 | Durham | ................ | G16H 20/10 482/7 |

* cited by examiner

GLOVE FOR USE IN COLLECTING DATA FOR SIGN LANGUAGE RECOGNITION

This application is a 35 U.S.C. § 371 National Stage Application of PCT/CN2015/087612, filed on Aug. 20, 2015, which claims the benefit of priority to Chinese application no. 201420471698.0, filed on Aug. 20, 2014 in China, the disclosures of which are incorporated herein by reference in their entireties.

The present utility model relates to gloves, in particularly to gloves for acquiring data for sign language recognition.

BACKGROUND

A normal person needs to understand sign language of a deaf-mute to accomplish communication between them at present. For a normal person who does not understand sign language of the deaf-mute, how to grasp the meaning expressed by the deaf-mute with sign language is a challenge for communication between them.

At present there are data gloves specially designed for deaf-mute. By disposing azimuth sensors at positions corresponding to each phalange bone phalanx of hands on the data gloves, the azimuth of each section of phalanx is sensed; and by disposing azimuth sensors at positions corresponding to the metacarpal on the data gloves, the azimuth of a hand is sensed. Then the azimuths are sent to the central computer for processing. The central computer calculates bending angles between adjacent phalanxes and bending angles between the last section of phalanxes adjacent to the metacarpal and the metacarpal based on this to determine the sign language, and outputs the meaning in speech by for example a speaker, thereby realizing communication between a normal person and a deaf-mute.

However, disposing azimuth sensors at positions corresponding to each phalanx of a hand on the data gloves is of high cost and requires large amount of calculation while processing.

SUMMARY

One of the technical problems to be addressed by one aspect of the present utility model is to reduce the number of azimuth sensors disposed at positions corresponding to phalanxes on the gloves, thereby reducing costs without impacting the detection performance.

According to one embodiment of the utility model, a pair of gloves for acquiring data for recognizing sign language is provided, comprising: a plurality of azimuth sensors for sensing hands' poses disposed at positions corresponding to phalanxes and metacarpi on the gloves, wherein said azimuth sensors are only disposed at phalanx positions other than positions of first phalanxes near their tips of at least one finger in index finger, middle finger, ring finger and little finger corresponding to hands' phalanxes on the gloves.

According to one embodiment of the utility model, said azimuth sensors are only disposed at phalanx positions other than positions of first phalanxes near their tips of index finger, middle finger, ring finger and little finger corresponding to hands' phalanxes on the gloves.

According to one embodiment of the utility model, said gloves further comprise a control unit for acquiring data of said azimuth sensors.

According to one embodiment of the utility model, bags are disposed inside said gloves for accommodating said azimuth sensors.

According to one embodiment of the utility model, bags are disposed outside said gloves for accommodating said azimuth sensors.

According to one embodiment of the utility model, height sensors for sensing data for calculating hands' heights are disposed on said gloves.

According to one embodiment of the utility model, said height sensors are baroceptors.

According to one embodiment of the utility model, said azimuth sensors disposed at positions corresponding to the metacarpi on the gloves are disposed on positions corresponding to two metacarpi.

According to one embodiment of the utility model, sizes of parts in said gloves that correspond to phalanxes and palms of hands match sizes of phalanxes and palms of men or women.

The present utility model found out that when a person's hands are making various gestures of sign language, the degrees of bending between phalanxes at finger tips and the second section of phalanxes from the tips are relatively constant, while the degrees of bending between other adjacent phalanxes or between the last phalanxes and their adjacent metacarpi are of large difference. Therefore, the former contributes less to the sign language identification than the latter. Therefore, in this embodiment, by removing azimuth sensors at positions of phalanxes at four finger tips, the effect of saving costs while substantially achieving the same accuracy of determining sign language.

DETAILED DESCRIPTION

Some preferred implementations of the present utility model will be described with reference to accompanying drawings.

Figure 1:
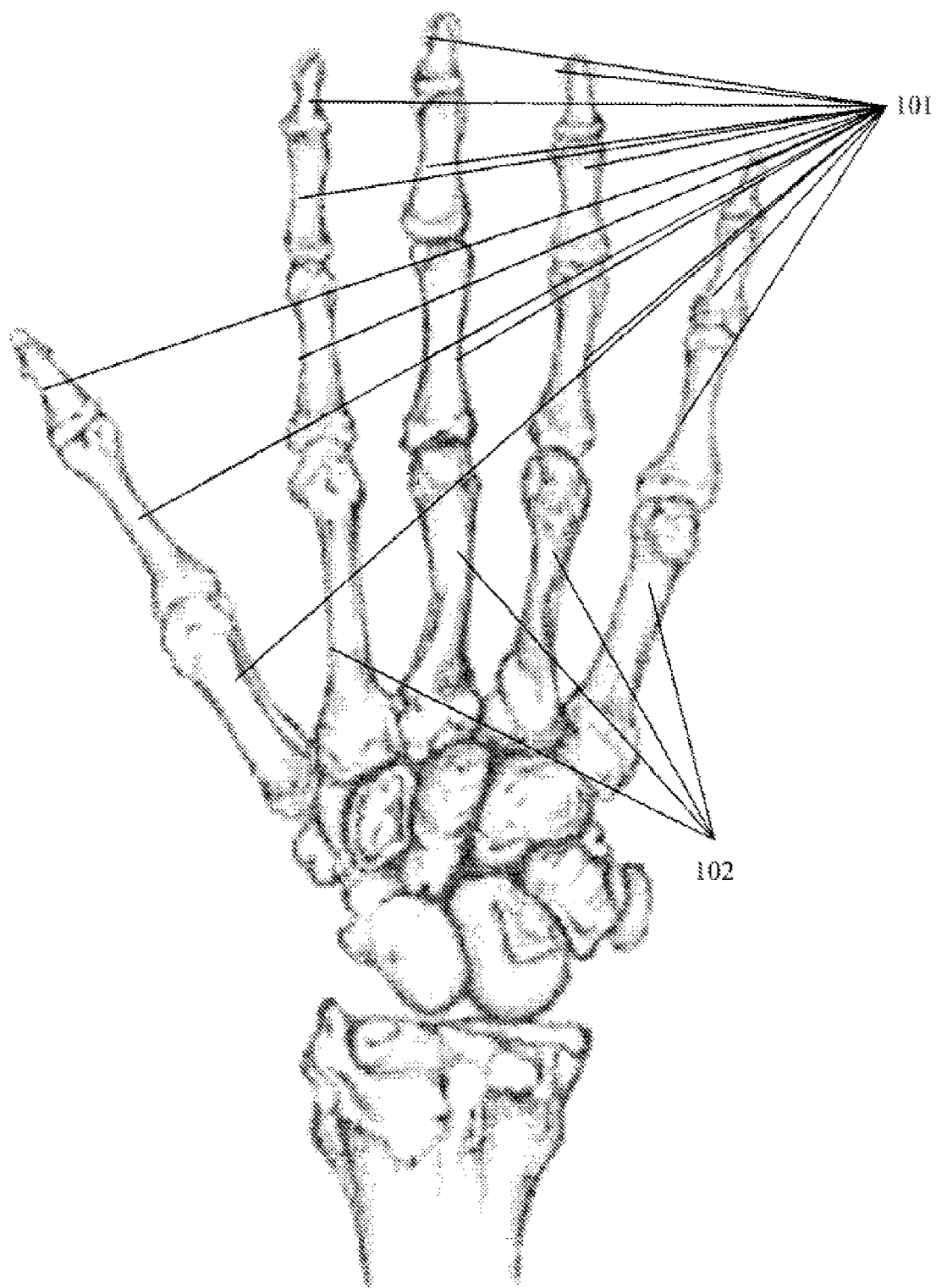
FIG. 1 is a structure diagram of bones of a hand.

FIG. 1 is a structure diagram of bones of a hand. As shown in FIG. 1, There are three long and thin bones connected in sequence by joints in each of the 5 fingers, which are called phalanxes 101, wherein the distal phalanx 101 of the thumb is inside the palm and may be considered as the last section of phalanx 101 of the thumb due to the less relevance between its movement range and The movement range of the palm's metacarpal. The four long and thin bones connected with the last phalanxes of the index finger, the middle finger, the ring finger and the little finger through joints are called metacarpal 102, which is located in the palm and through its position it is possible to known the position and angle of the palm. Since the four metacarpi 102 are fixed in the palm, while making a gesture, their relative positions hardly change. Its azimuths on each axis in a triaxial (such as fore and aft, left and right, up and down) coordinate system, and in turn the position and angle of the whole palm, may be calculated from the position and angle of one of the metacarpi.

Figure 2:
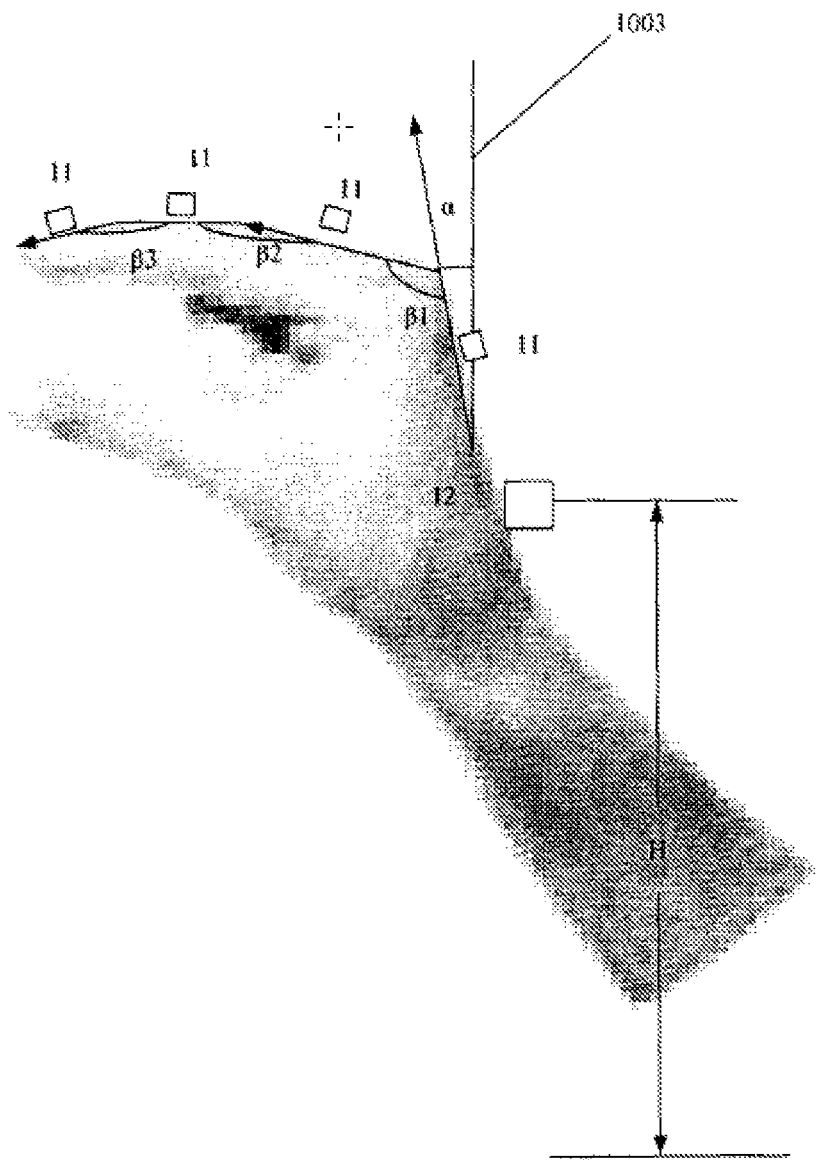
FIG. 2 is a diagram of parameters required to define gestures of sign language of a hand found out by the present utility model.

As shown in FIG. 2, while characterizing one sign language gesture, it may be simply determined using the azimuth α of the hand (namely the angle relative to the line of gravity 1003, the azimuth α of the palm being the azimuth of one metacarpal 102, which may also be obtained by averaging azimuths of metacarpi 102 of course), bending angles β2, β3 between adjacent phalanxes 101 on fingers, and bending angles β1 between the last phalanxes 101 adjacent to the metacarpi 102 and the metacarpi 102. That is, when the above-mentioned azimuth α, bending angles β2, β3 and β1 are determined, the sign language gesture of the hand is determined, hence the meaning its represents. The present utility model found out that in a sign language, making an action by hands in front of chest and making the same action by hands over head, namely making the same gesture by hands at different positions, might represent different meanings some times. Therefore, with prior art sign language recognition gloves, determining meaning of sign language only depending on gestures may make mistakes.

An embodiment of the present utility model introduces a hand height index. As shown in FIG. 2, Height sensors 12 are disposed at positions of the back of hands on gloves of the present utility model for sensing the heights of hands H. Of course, the height sensors 12 may also be positioned at other positions on the gloves as long as they can measure heights of the gloves. The heights should be relative heights, such as heights relative to the waist of a person. By calculating heights of hands relative to waist, the gloves of the present application can estimate heights of hands relative to other parts of the user's body and enable more accurate understanding of gestures by the user. That is, meaning of a gesture of sign language is determined by the above-mentioned poses of hands and heights H of hands, thereby improving accuracy of determining meaning of sign language. A gesture is a combination of the poses and heights of hands that can correspond to a certain meaning in sign language.

In addition, as shown in FIG. 2, a plurality of azimuth sensors 11 are disposed at positions corresponding to phalanxes and metacarpi on the gloves to acquire data for calculating azimuths of phalanxes and metacarpi for calculating azimuths of phalanxes and metacarpi. The bending angles β2, β3 between adjacent phalanxes may be derived from respective azimuths of the adjacent phalanxes, and bending angles β1 between the last phalanxes adjacent to the metacarpi and the metacarpi may be derived from azimuths of the last phalanxes and the metacarpi.

The above-mentioned azimuth data generally refers to all data that may be used to calculate azimuths of the carrier, such as the carrier's angular velocity, acceleration etc., from all of which the carrier's azimuth may be obtained. The azimuth data may be obtained by a triaxial micro-gyroscope, a triaxial micro-acceleration sensor and a triaxial terrestrial magnetism sensor wherein these three kinds of azimuth sensors may be used separately or in combination with the specific use manner as follows.

In the first implementation, the azimuth sensor may only include the above-mentioned triaxial micro-gyroscope.

In the second implementation, the azimuth sensor may only include the above-mentioned triaxial micro-acceleration sensor.

In the third implementation, the azimuth sensor includes the above-mentioned triaxial micro-gyroscope and the triaxial micro-acceleration sensor for measuring angular speed in the three coordinate axes' directions and measuring accelerations in said three coordinate axes' directions. In this approach, one azimuth $\gamma_a$ can be calculated from the angular speed, one azimuth $\gamma_b$ can be calculated from the acceleration and the last azimuth may be calculated by weighting, $\gamma=k\gamma a+(1-k)\gamma b$ (wherein $0 \le k \le 1$). The precondition for dosing so is that the triaxial micro-gyroscope and the triaxial micro-acceleration sensor use the same three-axis reference system. Triaxial micro-acceleration sensor features its sensitivity to noise, however it will not suffer result drifting since it's not influenced by result of the previous frame. While a triaxial micro-gyroscope features its insensitivity to noise, however suffers result drifting since it's influenced by previous frame and requires an initial azimuth. Therefore, this kind of approach combines advantages of these two approaches, achieving beneficial effects that it's both unlikely sensitive to noise and unlikely influenced by previous frames.

In the fourth implementation, azimuth sensors further include triaxial terrestrial magnetism sensors in addition to the above-mentioned triaxial micro-gyroscopes and the triaxial micro-acceleration sensors.

The height sensors 12 of the present utility model are baroceptors, and of course may be implemented with other height sensors. In the implementation of baroceptor, it senses exterior air pressure. The air pressure is different at different heights and is used to calculate the height of a hand. The aforementioned height H may be calculated by subtracting the absolute height of waist relative to sea level from the absolute height of a hand relative to sea level. In this way, it is possible to measure the height of a hand relative to other parts of the body to determine meaning of a gesture of sign language. While in use, before the user makes a gesture of sign language, the hand wearing glove is first put at the waist to measure the absolute height of waist. Then a corresponding gesture of sign language is made. When the value of height is required, the relative height of hand is derived by subtracting the absolute height of waist from the absolute height of hand. In this way, it is possible to calculate relative height of the hand that makes the gesture of sign language.

The meaning of gesture of sign language determined by gloves of the present application may be output as speech via a loudspeaking unit on the gloves or may be displayed as characters on a display on the gloves. It is also possible to output the meaning through other equipments to enable a deaf-mute to communicate with a normal person.

Figure 3A:
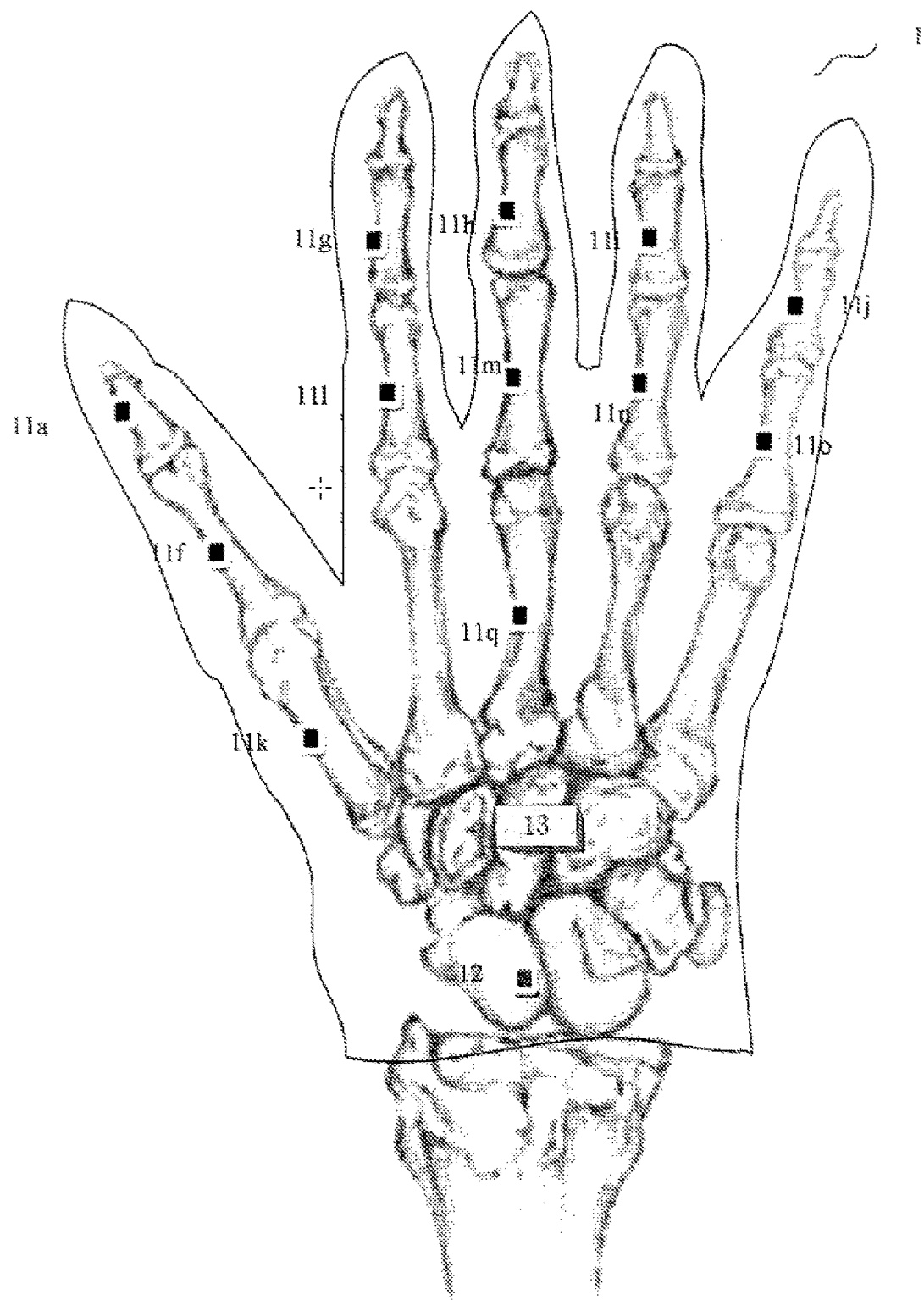
FIGS. 3a-b are diagrams of gloves when sign language recognition according to the first embodiment of the present utility model is implemented inside and outside gloves respectively.
Figure 3B:
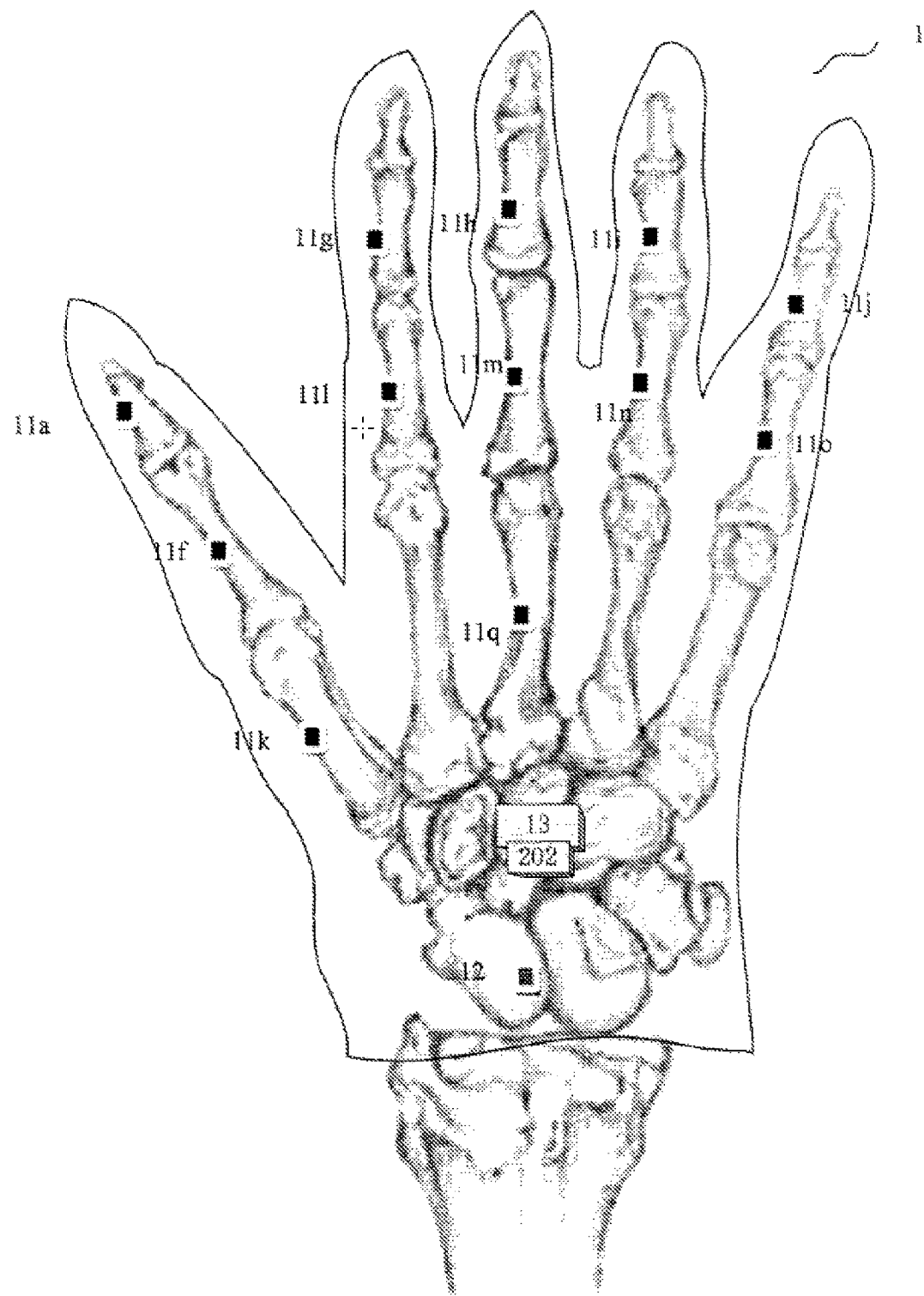

FIGS. 3a-3b are diagrams of gloves 1 when sign language recognition is according to the first embodiment of the present utility model is implemented inside and outside gloves respectively. In the first embodiments, no azimuth sensor is disposed at positions corresponding to phalanxes at tips of the four fingers on the gloves. This is because the present utility model found out that when a person's hands are making various gestures of sign language, the degrees of bending between phalanxes at finger tips and the second section of phalanxes from the tips are relatively constant, while the degrees of bending between other adjacent phalanxes or between the last phalanxes and their adjacent metacarpi are of large difference. Therefore, the former contributes less to the sign language identification than the latter. Therefore, in this embodiment, by removing azimuth sensors at positions of phalanxes at four finger tips, the effect of saving costs while substantially achieving the same accuracy of determining gesture. Although FIGS. 3a-b show no azimuth sensor is disposed at positions corresponding to phalanxes at four finger's tips on the gloves, it is possible not to dispose azimuth sensor at positions corresponding to phalanxes at any one, any two or any three finger tips.

Figure 5A:
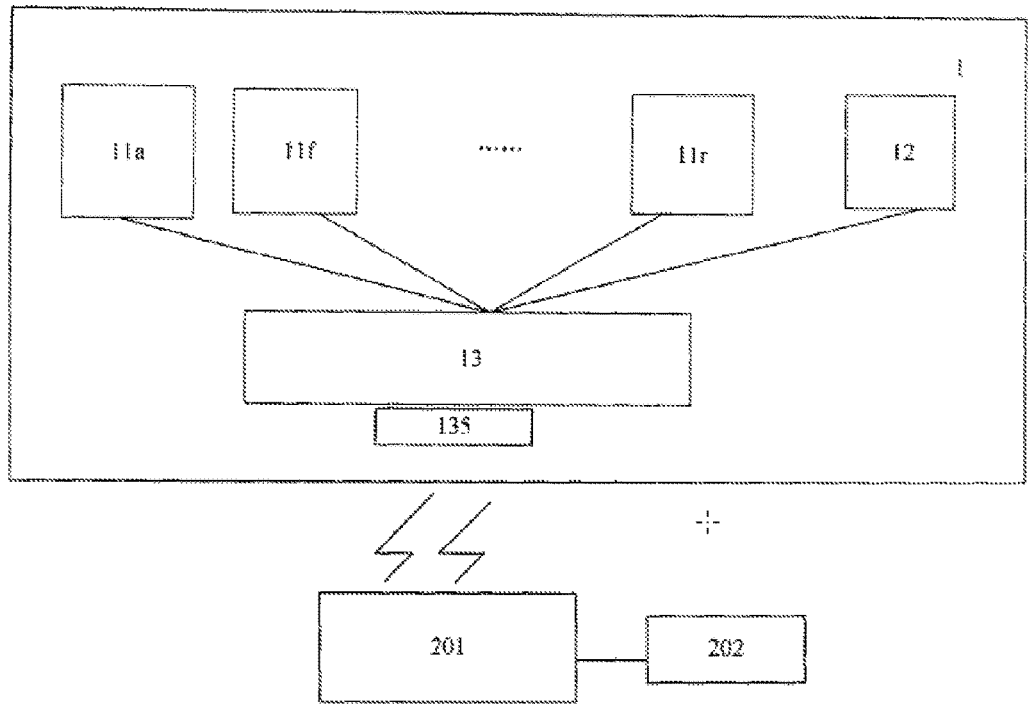
FIGS. 5a-b are structure block diagrams of gloves when sign language recognition according to embodiments of the present utility model is implemented inside and outside gloves respectively.

The gloves 1 in the present embodiment include 12 azimuth sensors 11a, 11f-11o, 11q and a height sensor 12 (however the height sensor 12 is not necessary, as described in connection with FIG. 2, there is also an implementation of identifying sign language only according to data acquired by the azimuth sensors). Azimuth sensors disposed at positions corresponding to phalanxes on the gloves are disposed at positions corresponding to phalanxes on the gloves, and the azimuth sensor 11q is disposed at the position corresponding to the metacarpi. The height sensor 12 is used to sense height data of a hand. In FIG. 3a, the control unit 13 receives data sensed by said plurality of azimuth sensors and the height sensor. As shown in FIG. 5a, the control unit 13 is coupled with a transceiver module 135 that transmits data sensed by said plurality of azimuth sensors and the height sensor to an external processor 201 for recognizing gestures of sign language. The recognized gestures of sign language are converted into speech and output through a output unit 202 such as a speaker or a display.

In FIG. 3b, the output unit 202 is coupled to said control unit 13 for converting gestures of sign language recognized by the control unit 13 as described in connection with FIG. 2 into speech or characters and outputting them. The principle is shown in FIG. 5b.

In FIG. 3a-3b, only an azimuth sensor 11q is disposed at the position corresponding to the metacarpal connected with the middle finger on the gloves. Disposing an azimuth sensor only at a position corresponding to one metacarpal is because that when a hand is making various poses, the differences among metacarpi are not as significant as the difference among azimuths of phalanxes and therefore it is possible to save costs by disposing an azimuth sensor only at a position corresponding to one metacarpal.

Figure 4A:
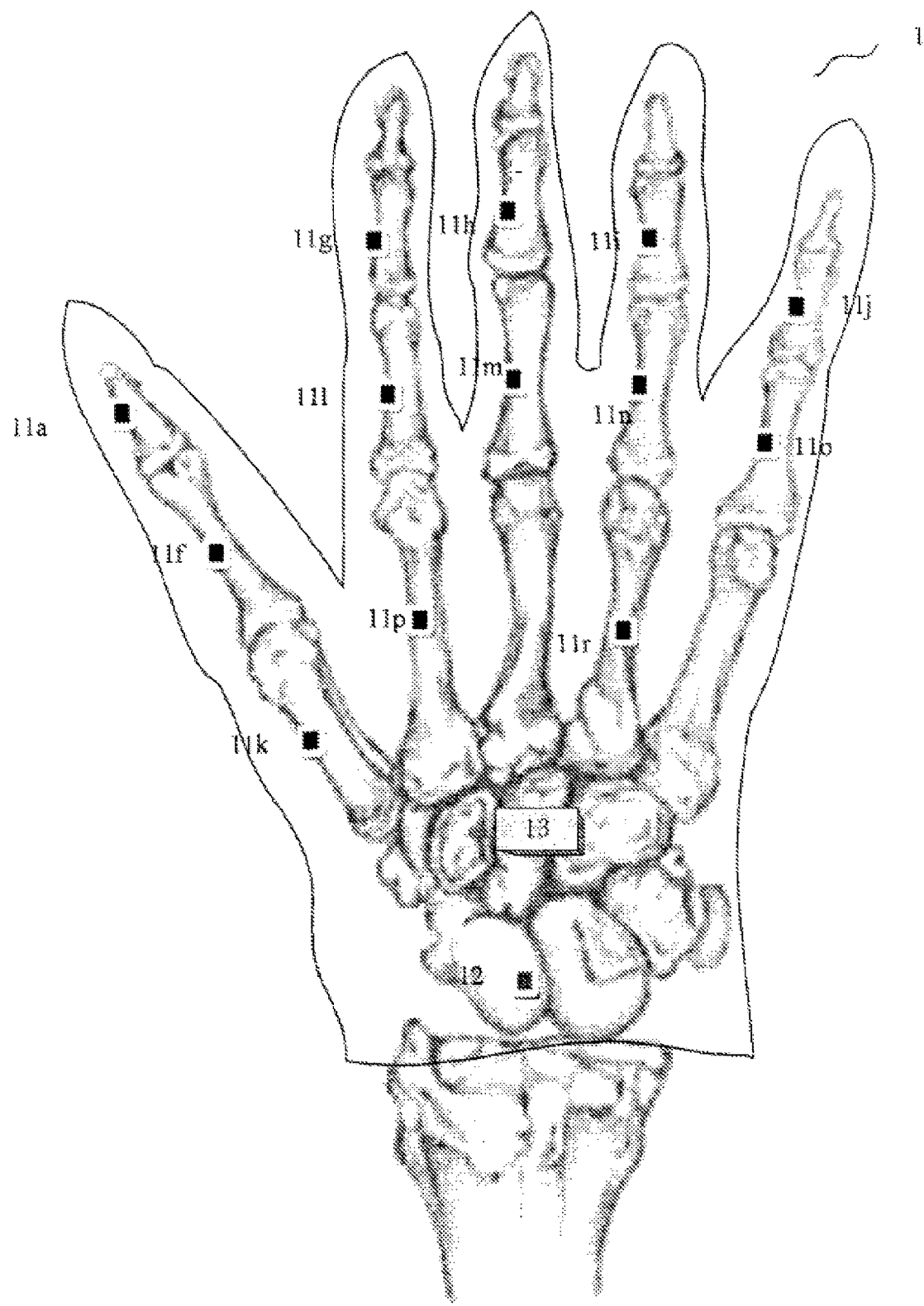
FIGS. 4a-b are diagrams of gloves when sign language recognition according to the second embodiment of the present utility model is implemented inside and outside gloves respectively.
Figure 4B:
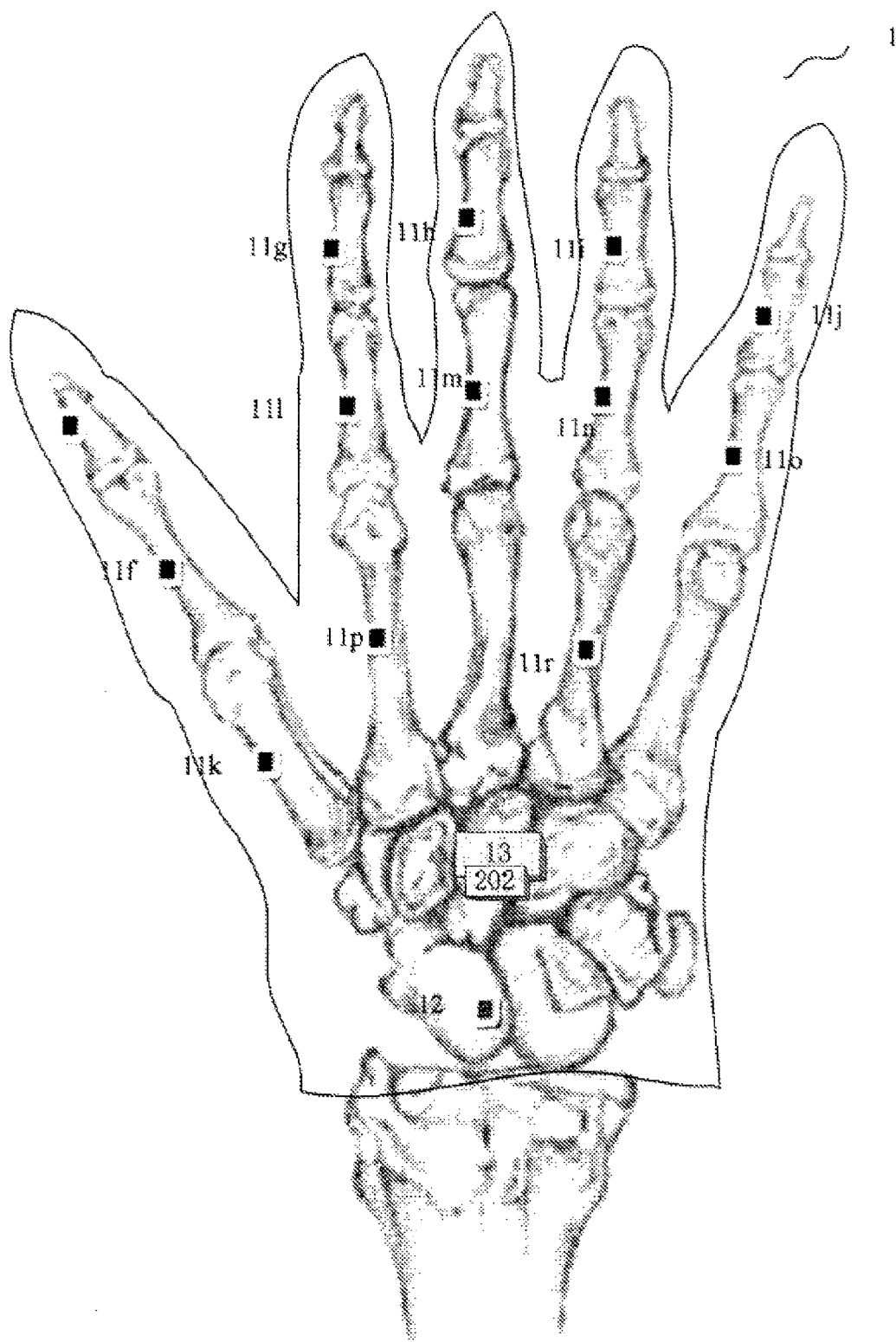

Of course, it is possible to dispose said azimuth sensor disposed at positions corresponding to the metacarpi on the gloves on positions corresponding to more than one metacarpi. In this way, it is possible to obtain azimuth of each metacarpal in said at least two metacarpi and calculate an average value of the obtained azimuths as the azimuth of the hand, which allows the obtained azimuth to be more accurate, and reduces gesture recognition error caused by minute difference among azimuths of metacarpi in fact when disposing only one azimuth sensor at the position corresponding to one metacarpal. Of course, it is also possible to dispose azimuth sensors at positions on four metacarpi. In addition, it is also possible to dispose azimuth sensors at positions corresponding to 2 or 3 metacarpi on the gloves. Preferably, azimuth sensors are disposed at positions corresponding to 2 metacarpi on the gloves. As shown in FIG. 4a-4b according to the second embodiment of the present utility model, the error caused by disposing an azimuth sensor only at a position corresponding to one metacarpal and the cost is saved to the maximum extent.

Figure 5B:
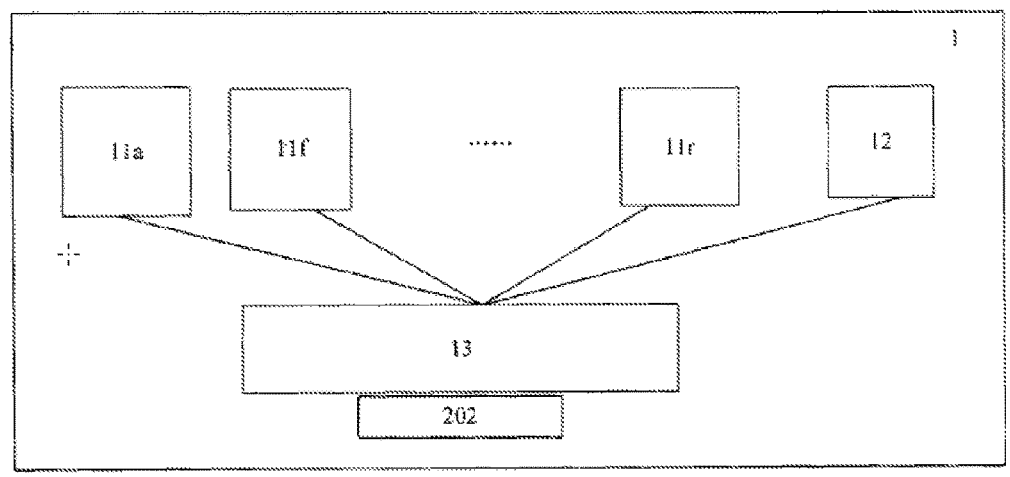

FIGS. 5a-b are structure block diagrams of gloves when sign language recognition according to embodiments of the present utility model is implemented inside and outside gloves respectively. FIG. 5a generally shows a case corresponding to FIGS. 3a, 4a, and FIG. 5b generally shows a case corresponding to FIGS. 3b, 4b.

Figure 6A:
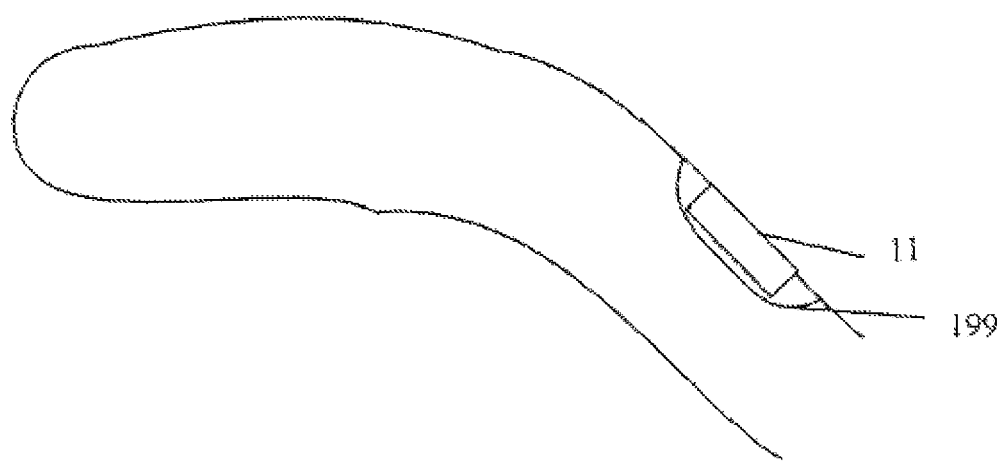
FIGS. 6a-d show four schematic diagrams of incorporating azimuth sensors on gloves respectively.
Figure 6B:
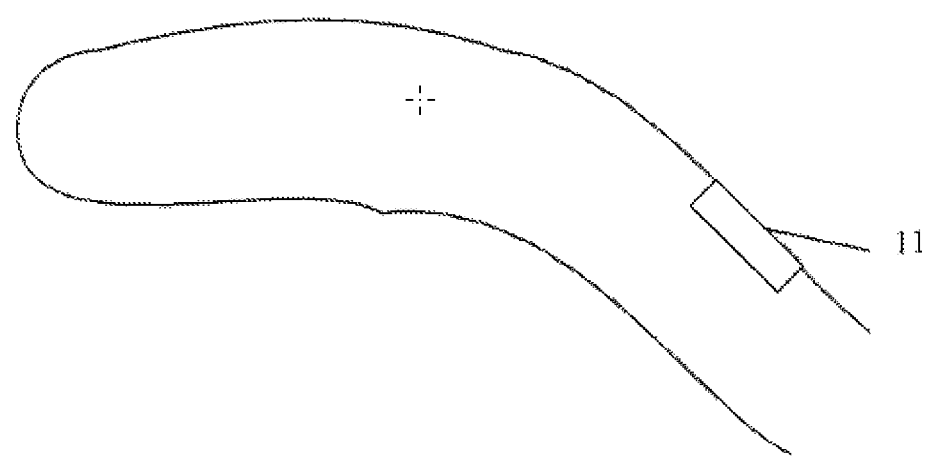
Figure 6C:
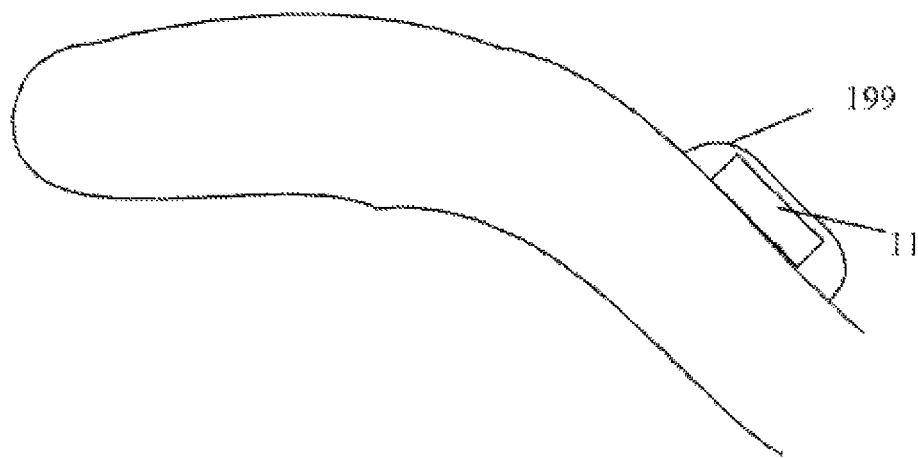
Figure 6D:
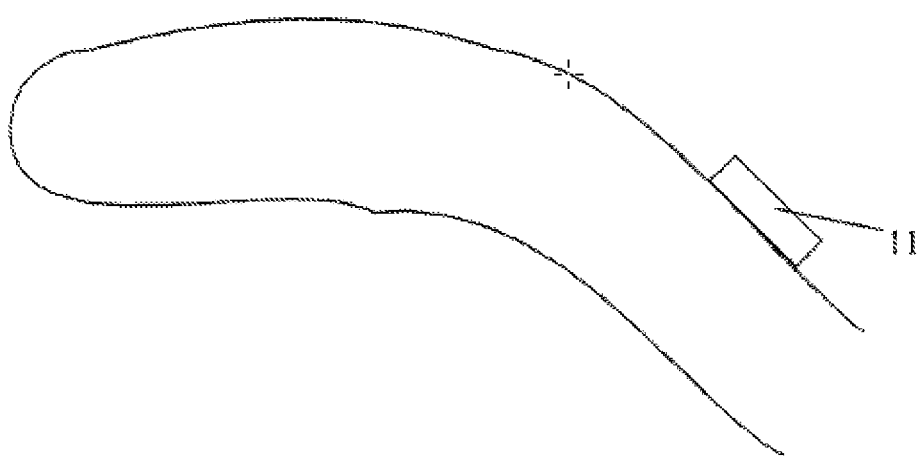

Fastness of azimuth sensors 11 on gloves may be implemented in a plurality of ways. As shown in FIG. 6a, there are bags 199 at positions for mounting azimuth sensors 11 on the inner sides of gloves for accommodating azimuth sensors 11. As shown in FIG. 6b, the azimuth sensors 11 are glued at inner wall of the gloves. As shown in FIG. 6c, there are bags 199 at positions for mounting azimuth sensors 11 on the outer sides of gloves for accommodating azimuth sensors 11. As shown in FIG. 6d, the azimuth sensors 11 are glued at outer wall of the gloves. There are also other mounting manners.

In addition, in the gloves 1, sizes of parts corresponding to phalanxes and palms match sizes of phalanxes and palms of men or women respectively, thereby forming gloves 1 suitable for men or women respectively and avoiding the problem of sensing data at error positions by azimuth sensors or height sensors since inconsistency between men and women's hands.

Although the present utility model described herein with reference to specific implementations, the scope of the present utility model is not limited to the illustrated details. It is possible to make various modifications in these details without departing from the basic principle of the present utility model and all these modifications fall within the scope of the present utility model.

The invention claimed is:

1. A system for acquiring data for recognizing sign language, comprising:
   a pair of gloves;
   a plurality of phalanx azimuth sensors configured to sense hands' poses, each of the plurality of phalanx azimuth sensors disposed on said pair of gloves; and
   at least one metacarpi azimuth sensor configured to sense at least one hands' poses, the at least one metacarpi azimuth sensors disposed on at least one glove of said pair of gloves,
   wherein said plurality of phalanx azimuth sensors and said at least one metacarpi azimuth sensor are positioned on the pair of gloves such that when a user is wearing said pair of gloves and said pair of gloves is sized for the user
   each of the plurality of phalanx azimuth sensors is positioned adjacent to a respective one of the user's phalanxes,
   the at least one metacarpi azimuth sensor is positioned adjacent o at least one of the user's metacarpi, and
   no sensor which provides data for recognizing sign language is disposed at first phalanxes near tips of at least one of the user's index finger, the user's middle finger, the user's ring finger and the user's little finger.

2. The system of claim 1, wherein when the user is wearing said pair of gloves and said pair of gloves is sized for the user, no sensor which provides data for recognizing sign language is disposed at first phalanxes near tips of the user's index finger, the user's middle finger, the user's ring finger and the user's little finger.

3. The system of claim 2, wherein sizes of parts in said pair of gloves that correspond to phalanxes and palms of hands match sizes of phalanxes and palms of men or women.

4. The system of claim 1, further comprising:
   a control unit configured to acquire data of said plurality of phalanx azimuth sensors and said at least one metacarpi azimuth sensor.

5. The system of claim 1, further comprising:
   a plurality of bags disposed inside said pair of gloves and configured to accommodate said plurality of phalanx azimuth sensors and said at least one metacarpi azimuth sensor, wherein each of the plurality of bags accommodates a single one of said plurality of phalanx azimuth sensors or said at least one metacarpi azimuth sensors.

6. The system of claim 1, further comprising:
a plurality of bags disposed outside said pair of gloves and configured to accommodate said plurality of phalanx azimuth sensors and said at least one metacarpi azimuth sensor, wherein each of the plurality of bags accommodates a single one of said plurality of phalanx azimuth sensors or said at least one metacarpi azimuth sensor.

7. The system of claim 1, further comprising:
a plurality of height sensors configured to generate sense data for calculating hands' heights, the plurality of height sensors disposed on said pair of gloves, wherein the system is configured to use the sense data in recognizing sign language.

8. The system of claim 7, wherein said height sensors are baroceptors.

9. The system of claim 1, wherein each of said pair of gloves includes at least one of said at least one metacarpi azimuth sensors.

\* \* \* \* \*

UNITED STATES PATENT AND TRADEMARK OFFICE
CERTIFICATE OF CORRECTION

PATENT NO. : 10,424,224 B2
APPLICATION NO. : 15/504708
DATED : September 24, 2019
INVENTOR(S) : Ben Wang et al.

Page 1 of 1

It is certified that error appears in the above-identified patent and that said Letters Patent is hereby corrected as shown below:

In the Claims

In Claim 1, at Column 6, Line 46, delete the letter "o" between the word "adjacent" and the word "at" and insert the word --to-- in its place.

Signed and Sealed this
Twenty-fourth Day of March, 2020

Andrei Iancu
*Director of the United States Patent and Trademark Office*